United States Patent Office 2,911,824
Patented Nov. 10, 1959

2,911,824

POWER COMPARING CALORIMETER

Ernst R. Czerlinsky, Arlington, and Raymond A. Mac-Millan, Greenwood, Mass., assignors to the United States of America as represented by the Secretary of the Air Force Application January 31, 1957, Serial No. 637,598

3 Claims. (Cl. 73—190)

(Granted under Title 35, U.S. Code (1952), sec. 266)

The invention described herein may be manufactured and used by or for the United States Government for governmental purposes without payment to us of any royalty thereon.

This invention relates to calorimeters, and more particularly to a precision power comparing calorimeter.

In the past, an obstacle to precise calorimetric determinations has been the presence of certain indeterminate thermodynamic factors. These factors include the heat supplied to the calorimeter by the stirring mechanism and the heat flow through the walls of the calorimeter, whose amount and direction are dependent on the temperatures inside and outside of the calorimeter. Since most calorimetric determinations involve supplying a quantity of heat or power to a calorimeter and measuring the resulting temperature difference as a function of time, it can be seen that the failure to eliminate the above mentioned factors would result in an inaccurate determination of the true temperature difference and this would produce errors in the final computations.

It is therefore a principal object of this invention to provide a high precision power comparing calorimeter.

A further object of this invention is to provide a method of eliminating indeterminate thermodynamic factors from calorimetric determinations.

Still another object of this invention is to provide a method of operating a calorimeter which minimizes the error effects due to heat loss.

Yet another object of this invention is to provide a power comparing calorimeter which is economical to construct, easy to operate and capable of rapid repetitive measurements.

These and other objects of this invention will become more apparent when understood in the light of the accompanying specification and drawings wherein.

Figure 1:
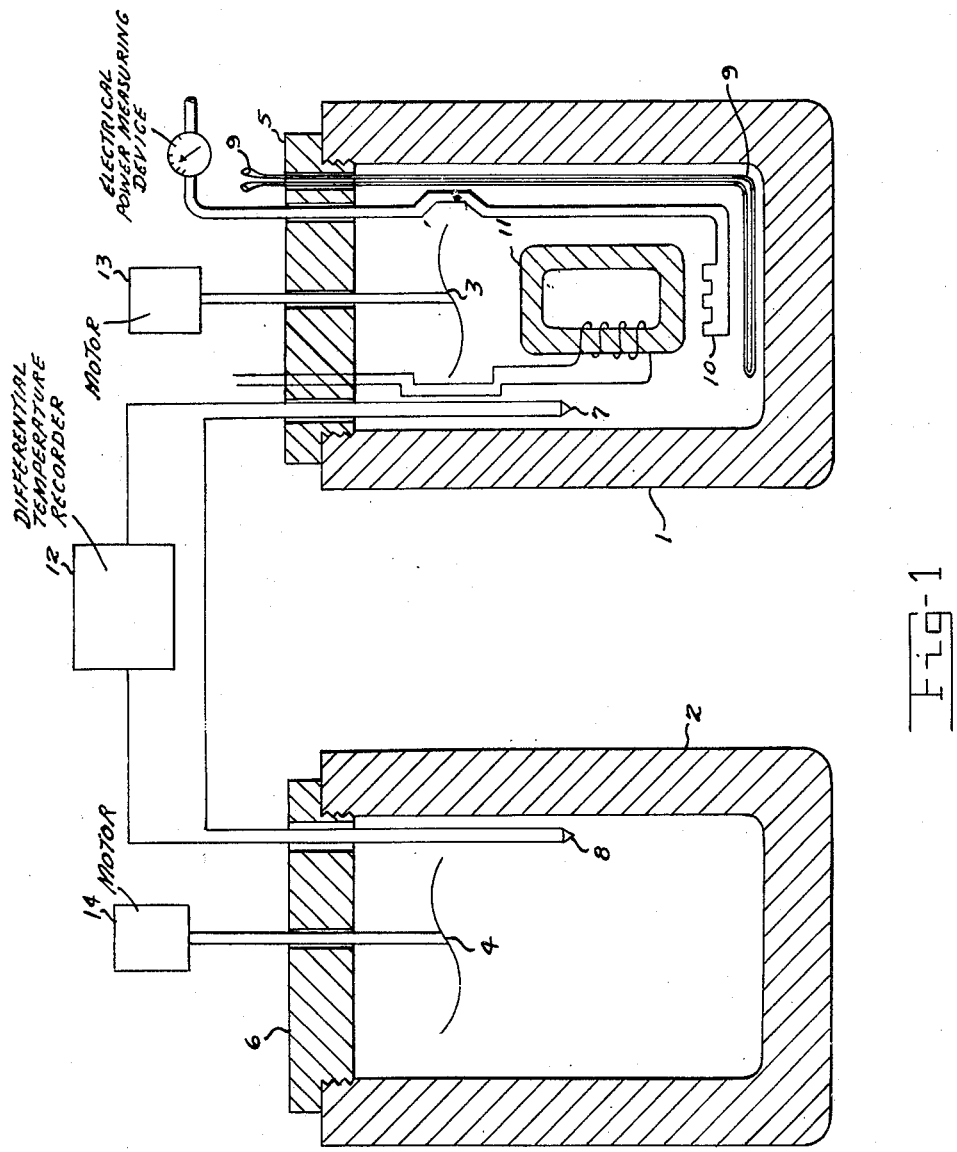
Fig. 1 is a side view disclosing an illustrative embodiment of this invention.

Referring now to Fig. 1, the calorimeter comprises two heat insulated jars 1 and 2, such as Dewar flasks or vessels insulated by material such as glass wool, cork, etc. The vessels are surrounded by air at ambient temperature or are immersed in a thermostable medium. The jars are sealed by covers 5 and 6, and are filled with a fluid such as oil. Identical stirring mechanisms 3 and 4 are mounted in the covers and are immersed in the fluid. These stirring mechanisms are driven by a pair of identical synchronous motors 13 and 14, see Fig. 1.

Jar 1 contains a cooling coil 9 which is connected to a source of cold gas or liquid and an electric heater 10. The heat generating device 11 whose power output, or heat dissipation rate, is to be measured is also mounted in the jar. In addition, both jars contain identical thermocouples 7 and 8, and these thermocouples are connected together and to a recorder 12, so that the resulting E.M.F. indicated by the recorder represents the temperature difference between the jars. The recorder chart is advanced at a constant rate so the record therefore is one of temperature difference versus time.

The calorimeter measures the power produced in a device by comparing its effect in the temperature in the calorimeter to the effect produced by applying a known amount of electrical power to the calorimeter. General thermodynamic considerations show that the generated power supplied to a calorimeter is proportional to the ratio of the temperature change per unit of time in the calorimeter. Mathematically if L is a generated power and W is a proportionality constant and T is the temperature and $t$ is the time, then $$L = W \frac{\nabla T}{\nabla t}$$

or more precisely $$L = W \frac{dT}{dt}$$

Physically W is the water value which in this case would be the mass of the contents of jar 1 multiplied by its specific heat.

Figure 2:
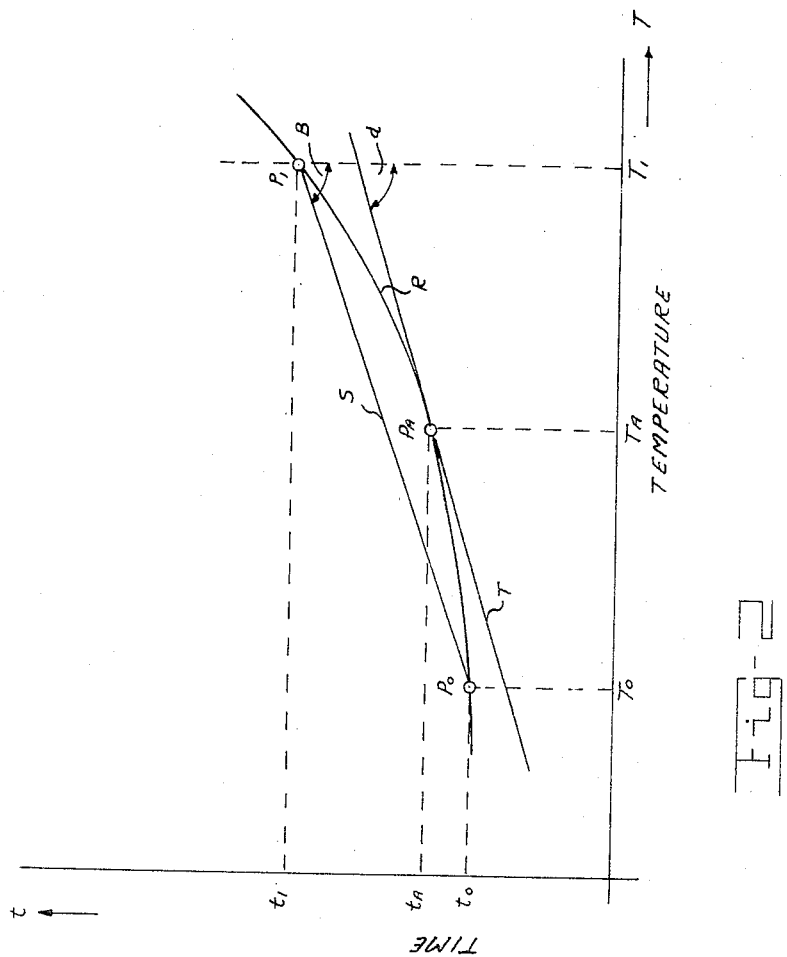
Fig. 2 is a schematic presentation of the temperature versus time curve of a typical calorimeter.

Referring to Fig. 2, the curve R shows the way the temperature in a typical calorimeter varies as a function of time. The curvature which is exaggerated for clarity, is due to indeterminate factors such as heat leakage through the walls of the calorimeter and heat energy supplied by the stirring mechanism. It is apparent from thermodynamic theory that if the temperature of the environment surrounding the jars is $T_A$ and the temperature of the jars is also initially $T_A$, then the point $P_A$ on the curve R representing the temperature $T_A$, is a point at which the heat leakage is zero. If T is the tangent to the curve R at the point $P_A$, its slope tangent $$\alpha = \frac{dT}{dt}$$

Since, as stated above, $$L = W \frac{dT}{dt}$$

then, $L = W$ tangent $\alpha$.

The presence of the above mentioned indeterminate thermodynamic factors prevents an accurate direct determination of the slope of T. It can be approximated, however, by the following procedure. If points on the curve $P_0$ and $P_1$ are chosen so their temperatures $T_0$ and $T_1$ are related to the initial temperature $T_A$ so that $T_1 - T_A = T_A - T_0$, and if a secant S is drawn between points $P_0$ and $P_1$, the slope of the secant S defined as the tangent $\beta$, see Fig. 2, will equal $$\frac{T_1 - T_0}{t_1 - t_0}$$

It can be seen that despite the extremely exaggerated curvature of curve R, secant S is almost parallel to tangent T. The difference between tangent $\beta$ and tangent $\alpha$ is the error, and this error is tolerable if it does not exceed the inherent experimental error of the measurements. It is apparent that if the difference between $T_1$ and $T_A$ and $T_A$ and $T_0$ are minimized the inherent error will become very small. In fact, as $P_1$ and $P_0$ both approach point $P_A$ on curve R, secant S begins to coincide with tangent T. Since it is not difficult to determine the slope of the secant S, and this will closely approximate the slope of T at the point $P_A$ on the curve R, i.e., tangent $\alpha \cong$ tangent $\beta$, the amount of heat supplied to the calorimeter can be determined.

In order to use the calorimeter, the calibration value $c_v$ must first be determined. Since L, the power supplied, has been shown to be proportional to tangent $\alpha$, and tangent $\alpha \cong$ tangent $\beta$, $c_v$ may appropriately be defined as follows:

$$c_v = \frac{\text{tangent } \beta}{L}$$

Since tangent $$\beta = \frac{T_1 - T_0}{t_1 - t_0}$$

then $$c_v = \frac{T_1 - T_0}{(t_1 - t_0)} \cdot \frac{1}{L}$$

It is evident that if $T_1$ and $T_0$ are chosen so they satisfy the above defined relationship with $T_A$, and a known amount of power $L_c$ is applied to the calorimeter, which is sufficient to raise the temperature in the calorimeter from $T_0$ to $T_1$ and if the time $(t_1-t_0)_c$ for doing this is measured, then $c_v$ can be calculated, i.e., $$c_v = \frac{T_1 - T_0}{(t_1 - t_0)_c} \cdot \frac{1}{L_c}$$

Once $c_v$ is known, the power $L_m$ supplied by the test device can be measured since $$L_m = \frac{T_1 - T_0}{(t_1 - t_0)_m} \cdot \frac{1}{c_v}$$

where $(t_1-t_0)_m$ is the time required to raise the temperature in the calorimeter from $T_0$ to $T_1$ with only the test device 11 in operation.

In actual operation the stirring mechanisms 3 and 4 are first set in operation and the temperature in jars 1 and 2 are both initially regulated to a temperature $T_A$, the temperature of the ambient air or the temperature of a surrounding thermostable medium. Then with the test sample 11 deenergized, cold gas or cold liquid is passed through cooling coils 9 to reduce the temperature of jar 1 from its initial low temperature $T_A$ to the first low value $T_0$. Then heat is supplied to the calorimeter by the heating coil 10 until the temperature in the calorimeter in jar 1 rises to the final high value $T_1$. The time required for this operation is recorded by the recording device 12 which charts the temperature difference between jars 1 and 2 as a function of time. During this time, the amount of heat supplied to the electric heater 10 is measured by appropriate electrical power measuring devices. With the amount of electrical power $L_c$ supplied to the calorimeter known, and the time required to raise the temperature of the calorimeter from $T_0$ to $T_1$ measured by the recording device 12, the calibration value of the calorimeter is determined. Next, the electric heating coil 10 is deenergized and cooling gases are supplied to cooling coils 9 in the calorimeter jar 1 to reduce the temperature in the jar from $T_1$ back to $T_0$. Then the test device or mass 11 is energized and its power $L_m$ generates heat in the calorimeter jar 1 until the temperature in the calorimeter jar 1 again rises to the final high value $T_1$. The time required for this is again measured by the recording device 12. This time $(t_1-t_0)_m$ is different than the initial time $(t_1-t_0)_c$ required, if the amount of heat supplied by the test mass 11 is different than the amount of heat supplied by the heating coils 10. Accordingly, since the value of the calibration constant has been determined, the power $L_m$ supplied by the test mass 11 can be determined by the equation $$L_m = \frac{T_1 - T_0}{(t_1 - t_0)_m} \cdot \frac{1}{c_v}$$

The importance of identical jar 2 and its associated stirring mechanisms and thermocouples results from inherent difficulties in stabilizing the initial temperature $T_A$ in jar 1. Heat is constantly being added to jar 1 by the stirring mechanism, and any temperature difference between the interior of the jar 1 and the ambient air or any thermostable medium outside of the jar will result in heat flow into or out of the jar. Since calorimetric determinations are almost always concerned with the measurement of temperature differences resulting from the addition of heat to a calorimeter, if the initial temperature $T_A$ were not stable, but was actually increasing or decreasing, then the determination of the measured temperature difference would be in error. For example, as an extreme case, suppose at any initial temperature it takes 10 minutes to raise the temperature in the flask 10° when a known amount of heat is applied. Suppose also that if $T_A$ were not stablized during this time interval the temperature in the flask would have risen 1° even if no heat were supplied to the flask by a heating coil or a test mass. Then, the actual measured temperature difference would be 11° instead of 10° as it would be if the initial temperature were kept constant. But using identical flasks or jars and a recording device for measuring the temperature difference between the jars, as described in Fig. 1, if both temperatures in such a case were started at some initial temperature $T_A$ and if the jars if left to themselves would rise in temperature 1° in ten minutes, it is apparent that the measured temperature difference between the two jars would be reflective of the true temperature difference supplied by the heating coil or test mass and the indeterminate factors produced in each jar caused by the stirring mechanisms of heat flow through the walls of the jars would be eliminated.

This suggests that the method of eliminating these indeterminate thermodynamic factors can be applied to any calorimetric determination. It would only be necessary to establish two thermodynamically equivalent regions, perform the calorimetric determination in one region, and measure the temperature difference between both regions as a function of time. In the above example, the identical thermodynamic regions were produced by using identical heat insulated jars or Dewar flasks surrounded by the same thermostable medium or ambient air. It is apparent, however, that it is only necessary that the regions selected be identical thermodynamically regardless of their external shapes.

A calorimeter constructed according to this invention is very useful from a practical standpoint since the cooling coils 9 in jar 1 permit the temperature in the calorimeter to be reduced to the starting value very quickly permitting rapid repetitive measurements.

A detailed history of the development and operation of the instant device as well as extensive data concerning dimensions and detailed description of operation are contained in the report entitled, "Calorimetric Loss Measurements on Ferromagnetic Cores." This data was compiled by Czerlinsky and MacMillan, the instant inventors, was published by ASTIA Document No. AD117085 by the Air Force Cambridge Research Center and is available through the U.S. Department of Commerce, Office of Technical Services, Washington 25, D.C.

The above described device should be interpreted as illustrative and not restrictive. The scope of the invention is to be determined by reference to the appended claims wherein:

We claim:

1. A calorimeter for measuring the power developed by an energizable test device, said calorimeter comprising identical heat insulated jars capable of containing oil, identical stirring means in each jar, temperature measuring means in each jar and means connected to said last mentioned means for recording the temperature difference between the jars as a function of time, heating and cooling means in one of said jars, means for controlling the input of said heating means, said test device being mounted in said one jar so that its heat dissipation rate can be measured.

2. A calorimeter for measuring power developed in ferromagnetic cores comprising two identical heat insulated jars, identical stirring means in each jar, temperature recording means connected to the interior of both jars for recording temperature differences between the jars as a function of time, said temperature recording means comprising a single thermocouple situated in each jar and connected together by means of a differential temperature recorder, heating and cooling means in one of said jars, said magnetic core being mounted for testing in the same jar, means for measuring the heat input to said heating means and means for energizing said ferromagnetic core so that the power developed in said ferromagnetic core can be measured.

3. A calorimeter device for testing power developed in ferromagnetic cores, comprising two identical heat insulated jars, one of said test cores being contained in one of said jars, means for applying electrical power to the core to produce heating thereof, said jars both being adapted to contain a heat transfer fluid, identical stirring means in each jar to agitate the fluid in each jar in an identical manner, identical means for operating said stirrers, identical thermocouple means in both jars for determining the temperature in each jar, cooling means in the jar containing the core for reducing the temperature therein to be identical with that of the other jar, a differential temperature recorder between said jars connected to said thermocouples for measuring the temperature differential between the fluids in said jars in relation to time during the testing period of said ferromagnetic core.

References Cited in the file of this patent

UNITED STATES PATENTS

| | | |
|---|---|---|
| 1,151,761 | Davis | Aug. 31, 1915 |
| 2,347,661 | Butland | May 2, 1944 |
| 2,398,606 | Wang | Apr. 16, 1946 |
| 2,673,326 | Stauffer | Mar. 23, 1954 |
| 2,797,575 | Sand | July 2, 1957 |
| 2,800,793 | Oliver | July 30, 1957 |

FOREIGN PATENTS

| | | |
|---|---|---|
| 953,800 | France | May 30, 1949 |